(12) United States Patent
Okada (10) Patent No.: US 9,967,422 B2
(45) Date of Patent: May 8, 2018

(54) IMAGE READING DEVICE AND IMAGE FORMING APPARATUS

(71) Applicant: KYOCERA Document Solutions Inc., Osaka (JP)

(72) Inventor: Takehiko Okada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days. days.

(21) Appl. No.: 15/700,632

(22) Filed: Sep. 11, 2017

(65) Prior Publication Data

US 2018/0097963 A1    Apr. 5, 2018

(30) Foreign Application Priority Data

Sep. 30, 2016 (JP) ................................. 2016-194756

(51) Int. Cl.
*H04N 1/12* (2006.01)
*H04N 1/00* (2006.01)

(52) U.S. Cl.
CPC ....... *H04N 1/1235* (2013.01); *H04N 1/00599* (2013.01); *H04N 2201/0094* (2013.01)

(58) Field of Classification Search
CPC .................................................. H04N 1/1235
See application file for complete search history.

(56) References Cited

U.S. PATENT DOCUMENTS

| 3,823,488 A * | 7/1974 | Houben ................. B65H 20/14 226/196.1 |
| 4,145,819 A * | 3/1979 | Fleissner ................. F26B 13/12 34/115 |
| 5,673,837 A * | 10/1997 | Meschi .................. B65H 35/10 225/100 |
| 6,058,287 A * | 5/2000 | Haneda ................ G03G 15/657 399/397 |
| 6,076,819 A * | 6/2000 | Koike .................... B65H 3/042 271/108 |
| 2011/0026995 A1* | 2/2011 | Kanda .................... B65H 29/26 399/407 |
| 2013/0101324 A1* | 4/2013 | Yamamoto ......... G03G 15/0189 399/323 |
| 2016/0085210 A1* | 3/2016 | Furuta .................. G03G 21/206 399/92 |
| 2016/0193856 A1* | 7/2016 | Haenen .................. B41J 11/007 347/104 |

FOREIGN PATENT DOCUMENTS

JP        2005-200152 A    7/2005

* cited by examiner

*Primary Examiner* — Ted Barnes
(74) *Attorney, Agent, or Firm* — IP Business Solutions, LLC (57) ABSTRACT

An image reading device includes a document feeder and a reader. The document feeder includes a document tray and feeds an original document loaded on the document tray. The reader includes an original glass plate, a reading unit, and a document separating member. At least one of the document feeder and the reader is provided with a fan that creates an air flow. A first duct is provided in a housing of the reader. The document separating member is provided with a plurality of first discharge holes through which the air flowing through the first duct is discharged. A second duct is provided in a housing of the document feeder. The wall of the document feeder is provided with a plurality of second discharge holes through which the air flowing through the second duct is discharged.

18 Claims, 12 Drawing Sheets

Fig.12B though the second duct on a side of a wall of the document feeder facing the first direction and in the direction perpendicular to the direction of feed, the wall facing the document separating member. The wall of the document feeder is provided with a plurality of second discharge holes through which the air flowing through the second duct is discharged.

IMAGE READING DEVICE AND IMAGE FORMING APPARATUS

INCORPORATION BY REFERENCE

This application claims priority to Japanese Patent Application No. 2016-194756 filed on 30 Sep. 2016, the entire contents of which are incorporated by reference herein.

BACKGROUND

The present disclosure relates to image reading devices and image forming apparatuses and particularly relates to a technique for reading an original document in a so-called fed-document reading mode.

Reading an original document is classified into two modes: fed-document reading mode and stationary document reading mode. The fed-document reading mode is a mode of reading an original document in such a manner that, with a reading unit kept fixed at a predetermined position on a back side of an original glass plate, the original document is fed by a document feeder to pass through a reading position on a front side of the original glass plate.

In an image reading device that reads an original document in the fed-document reading mode, generally, a document separating member is provided downstream of the reading position in a direction of feed of the original document. This document separating member guides the original document read by the reading unit to separate the original document from the front surface of the original glass plate and the separated original document is conveyed to an eject portion of the document feeder. Furthermore, a general image reading device is provided with, for example, a fan for creating an air flow flowing in the direction of feed of the original document and the fan lifts the original document by the air flow to separate the original document from the front surface of the original glass plate.

SUMMARY

A technique further modified from the above known technique is proposed as an aspect of the present disclosure.

An image reading device according to one aspect of the present disclosure includes a document feeder and a reader. The document feeder includes a document tray and feeds an original document loaded on the document tray. The reader includes: an original glass plate; a reading unit that reads the original document fed to a predetermined reading position on a surface of the original glass plate facing a first direction by the document feeder, the reading unit reading the original document from a side of the original glass plate facing a second direction opposite to the first direction; and a document separating member that guides the original document read by the reading unit to separate the original document from the surface of the original glass plate facing the first direction, the document separating member being provided downstream of the reading position in a direction of feed of the original document. At least one of the document feeder and the reader is provided with a fan that creates an air flow. A first duct extending in a direction perpendicular to the direction of feed is provided in a housing of the reader to allow the air flow created by the fan to flow through the first duct on a side of the document separating member facing the second direction and in the direction perpendicular to the direction of feed. The document separating member is provided with a plurality of first discharge holes through which the air flowing through the first duct is discharged. A second duct extending in the direction perpendicular to the direction of feed is provided in a housing of the document feeder to allow the air flow created by the fan to flow through the second duct on a side of a wall of the document feeder facing the first direction and in the direction perpendicular to the direction of feed, the wall facing the document separating member. The wall of the document feeder is provided with a plurality of second discharge holes through which the air flowing through the second duct is discharged.

An image forming apparatus according to another aspect of the present disclosure includes the above-described image reading device and an image forming section that forms on a recording paper sheet an image acquired by reading of the image reading device.

DETAILED DESCRIPTION

Figure 1:
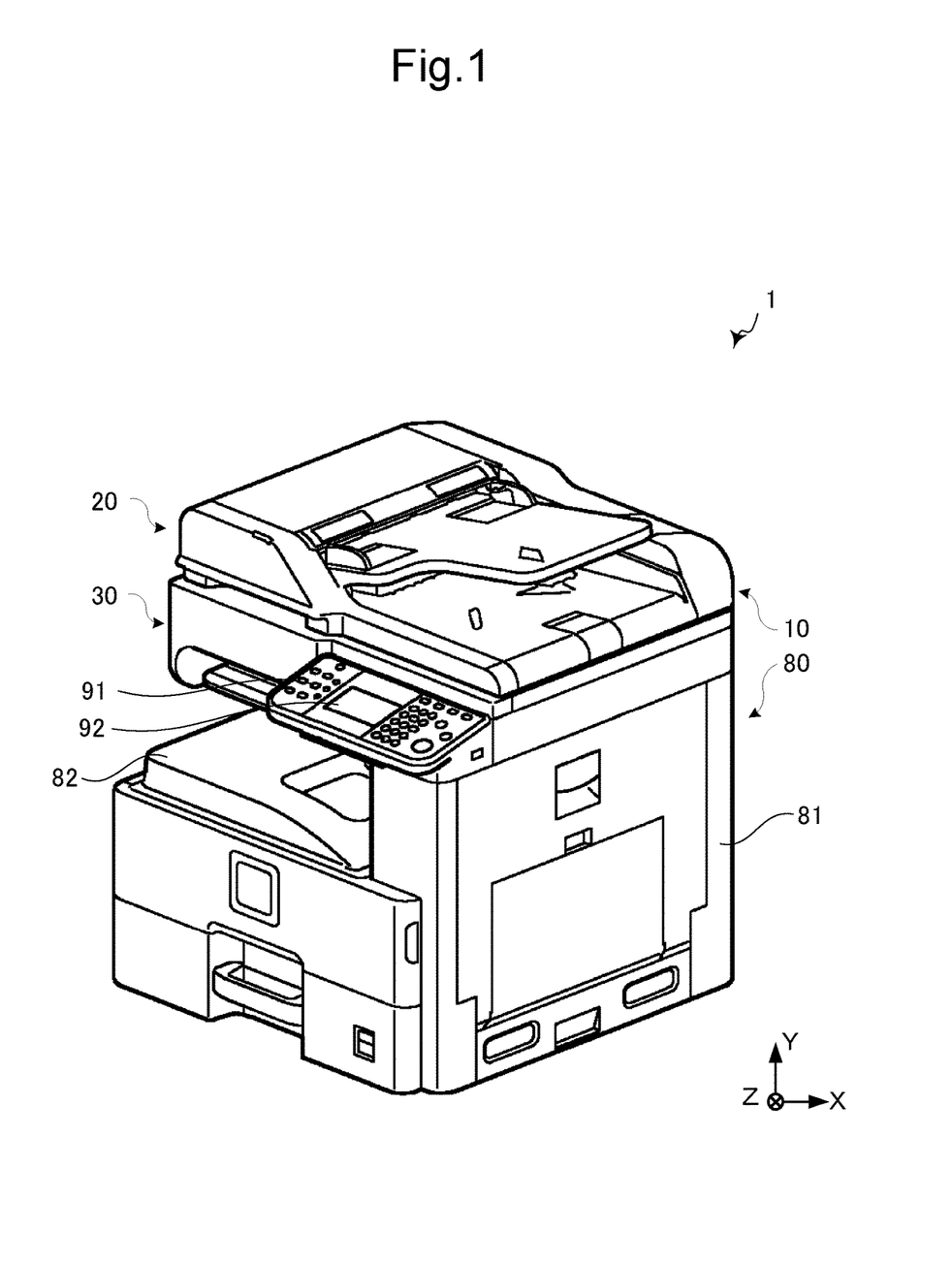
FIG. 1 is a perspective view showing an image forming apparatus with an image reading device according to one embodiment of the present disclosure.

Hereinafter, a description will be given of an image reading device and an image forming apparatus both according to one embodiment of the present disclosure with reference to the drawings. FIG. 1 is a perspective view showing an image forming apparatus with an image reading device according to one embodiment of the present disclosure.

The image forming apparatus 1 is a multifunction peripheral having multiple functions, including a facsimile communication function, a copy function, a print function, and a scan function. As shown in FIG. 1, the image forming apparatus 1 is roughly composed of an apparatus body 80 and an image reading device 10 disposed over the apparatus body 80.

A housing 81 constituting a shell of the apparatus body 80 accommodates an unshown sheet feed section, an unshown image forming section, and so on. The image forming section forms, based on image data generated from an original document read by the image reading device 10, an image on a recording paper sheet fed from the sheet feed section. The recording paper sheet on which the image has been formed is subjected to fixation processing and then discharged to a sheet output tray 82.

An operating section 91 and a display section 92 are disposed at the front of the housing 81 of the apparatus body 80. The display section 92 is formed by including a liquid crystal display (LCD) or an organic light-emitting diode (OLED) display. Furthermore, the operating section 91 is formed of a plurality of operating keys through which a user's operation on a screen displayed on the display section 92 is accepted. When a touch panel is provided at the front of the display section 92, the touch panel serves as the operating section 91. By a user's operation using the operating section 91 or the like, an instruction to form an image, an instruction to read an image, and other instructions are input to the image forming apparatus 1 or the image reading device 10.

Figure 2:
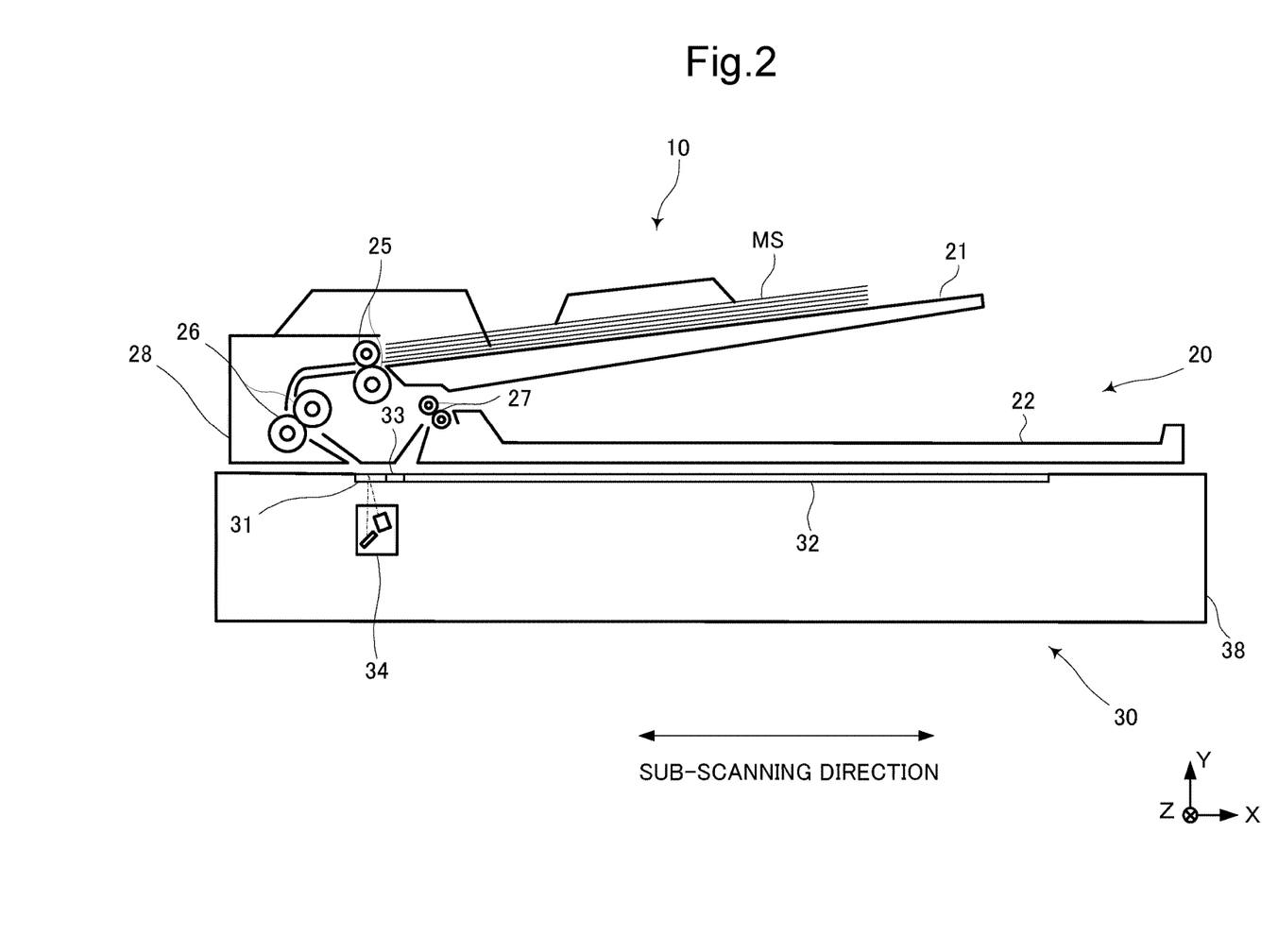
FIG. 2 is a cross-sectional view showing the structure of the image reading device according to the one embodiment of the present disclosure.

FIG. 2 is a cross-sectional view showing the structure of the image reading device 10 according to the one embodiment of the present disclosure. The image reading device 10 includes a reader 30 and a document feeder 20 disposed over the reader 30. For ease of visibility of the drawings, FIG. 2 does not show a fan 40, a first duct 50, a second duct 60, and so on which will be described later with reference to FIG. 3 and so on.

The document feeder 20 includes a document tray 21, a document eject tray 22, a pick-up roller pair 25, a conveyance roller pair 26, a document eject roller pair 27, and so on. The document feeder 20 picks up, by the pick-up roller pair 25, original documents one by one from a stack of original documents loaded on the document tray 21, feeds the picked original document to a predetermined reading position on a surface (front surface) of an after-mentioned first original glass plate 31 of the reader 30 facing a plus Y direction (the first direction) by the conveyance roller pair 26 to enable the reader 30 to read the original document through the first original glass plate 31, and then ejects the original document to the document eject tray 22 by the document eject roller pair 27.

The first original glass plate 31 and a second original glass plate 32 are fitted in openings formed in a housing 38 of the reader 30. A reading unit 34 extending in a main scanning direction (the Z direction in the figure) is provided in an interior of the housing 38 on sides of the first original glass plate 31 and second original glass plate 32 facing a minus Y direction (the second direction). The reading unit 34 is an image reading sensor composed of: a light-emitting part (not shown) formed of a plurality of LEDs including a red LED, a green LED, and a blue LED; and a light-receiving part (not shown), such as a CMOS (complementary metal oxide semiconductor) image sensor. The reading unit 34 is provided movably in a sub-scanning direction (the X direction in the figure).

The image reading device 10 has, as modes of reading an original document, both of a fed-document reading mode and a stationary document reading mode. In the stationary document reading mode, the reading unit 34 reads an original document placed on the second original glass plate 32 while being reciprocated in the sub-scanning direction by a reading unit drive section (not shown) formed of a motor, a gear, and so on. On the other hand, in the fed-document reading mode, the reading unit 34 is kept fixed on a back side of the first original glass plate 31 and, in this state, reads an original document fed by the document feeder 20 and passing through the reading position on the front surface of the first original glass plate 31.

Figure 3:
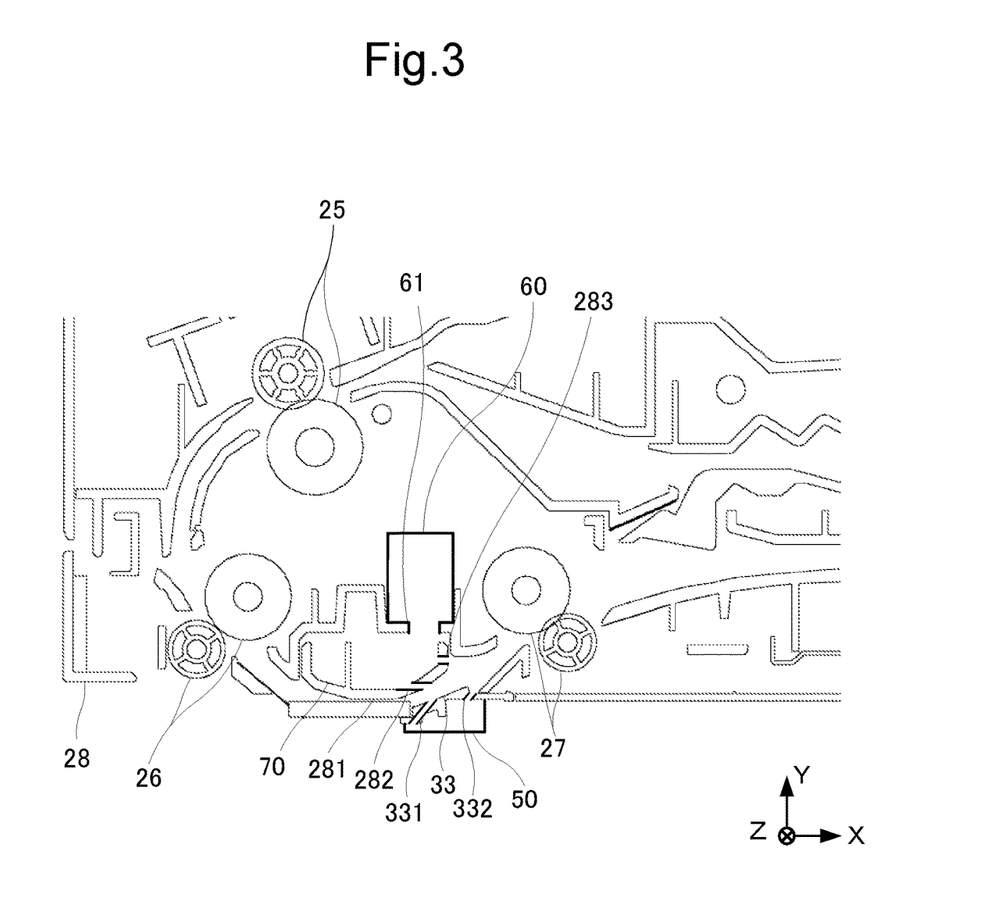
FIG. 3 is a cross-sectional view showing a detailed structure of the image reading device according to the one embodiment of the present disclosure.
Figure 4A:
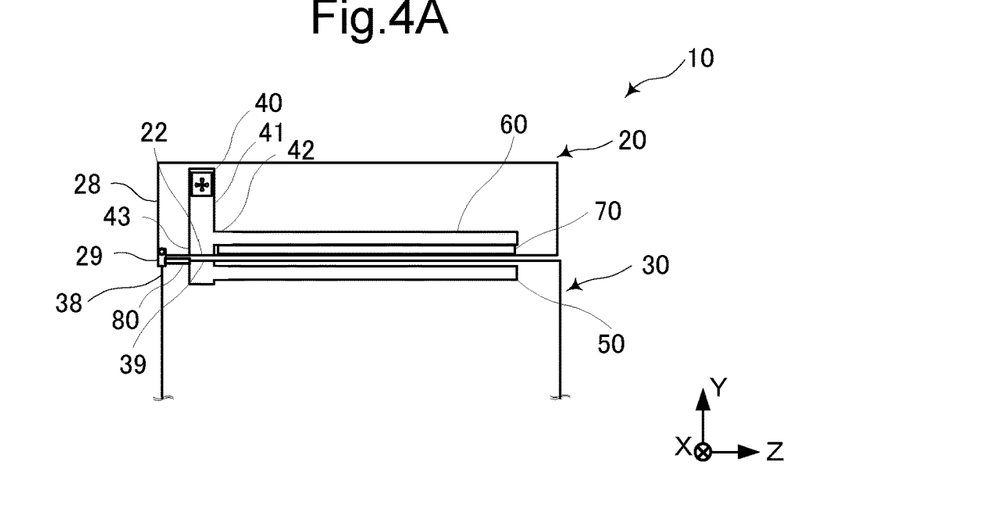
FIGS. 4A and 4B are cross-sectional views showing the image reading device according to the one embodiment of the present disclosure when viewed from a different direction from that of FIG. 3.
Figure 4B:
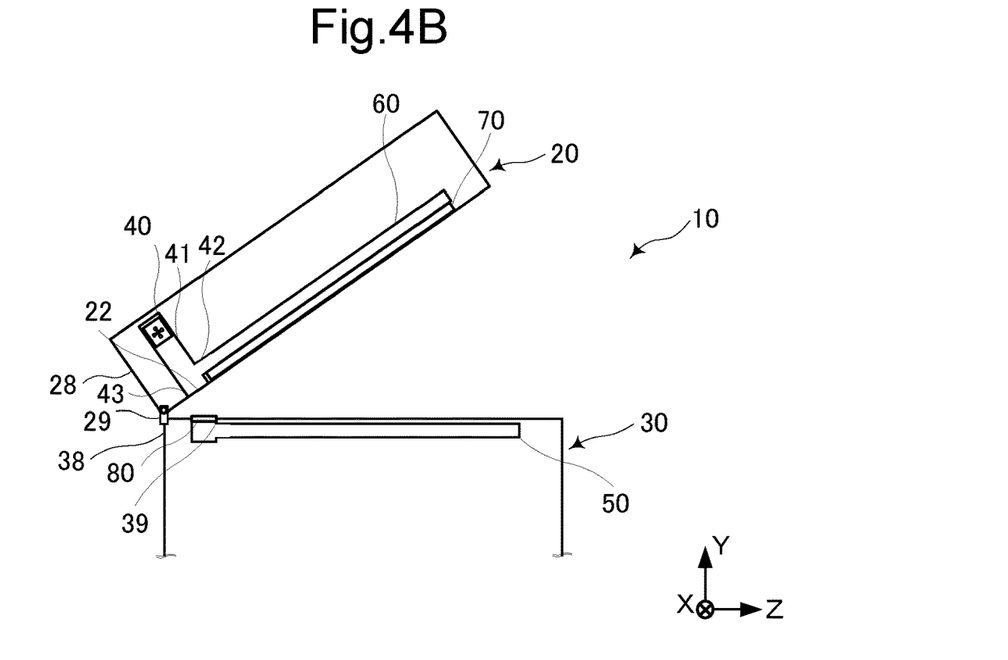
Figure 5:
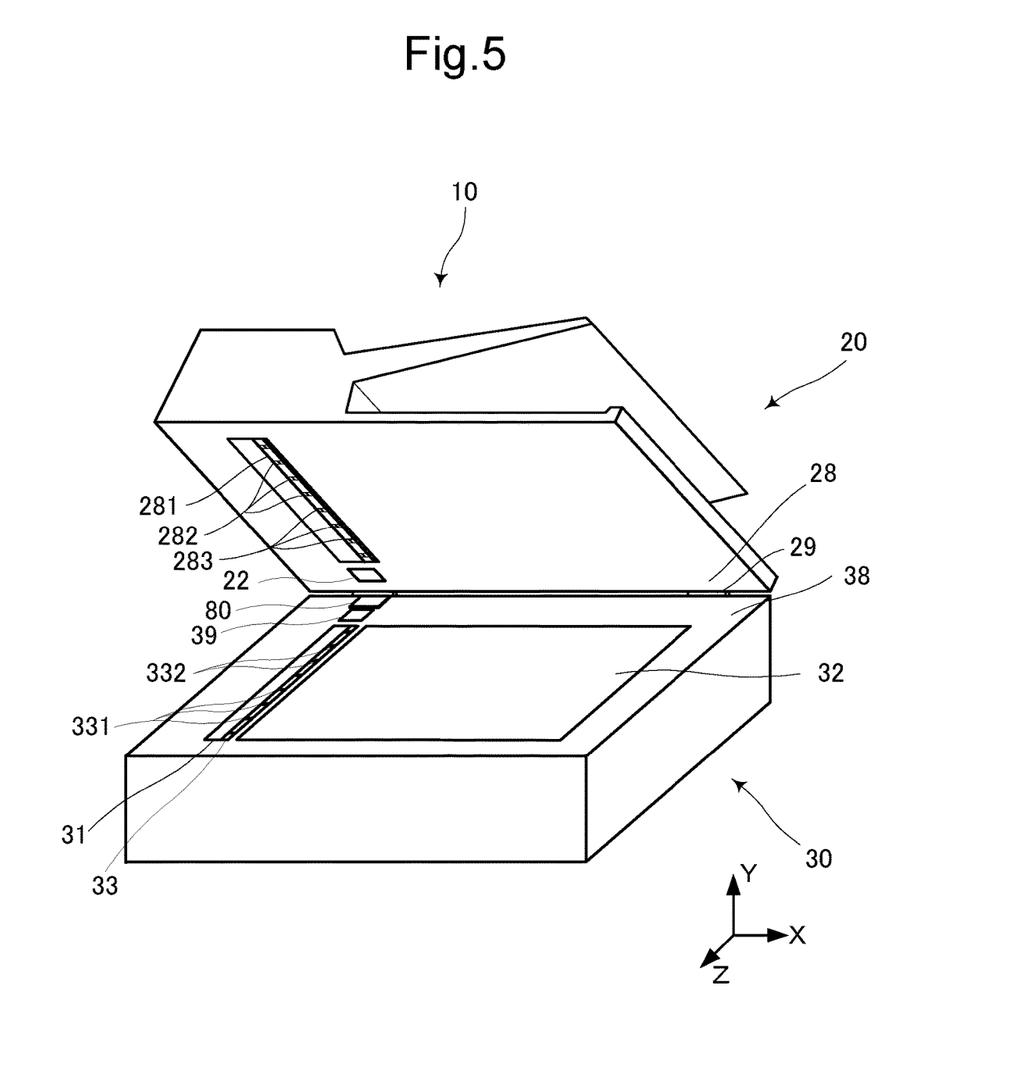
FIG. 5 is a perspective view showing the image reading device according to the one embodiment of the present disclosure.

FIG. 3 is a cross-sectional view showing a detailed structure of the image reading device 10. FIGS. 4A and 4B are cross-sectional views showing the image reading device 10 when viewed from a different direction (the X direction) from that of FIG. 3. FIG. 5 is a perspective view showing the image reading device 10. As shown in FIGS. 3, 4A, and 4B, the housing 28 of the document feeder 20 is internally provided with a second duct 60 extending in a direction (the X direction in the figures) perpendicular to the direction of feed of the original document. Furthermore, the housing 38 of the reader 30 is internally provided with a first duct 50 extending in the direction perpendicular to the direction of feed of the original document. An air flow created by a fan 40 provided in an interior of the housing 28 of the document feeder 20 flows through the first duct 50 and the second duct 60.

The fan 40 takes in air through an unshown louver formed at the housing 28 of the document feeder 20. The air flow created by the fan 40 first flows through a branch duct 41. The branch duct 41 includes two branch passages: a first branch passage 42 and a second branch passage 43, so that the air flow created by the fan 40 is divided into two flows. The first branch passage 42 is connected to the second duct 60 provided in the housing 28 of the document feeder 20. Air flows through the second duct 60 in the plus Z direction.

As shown in FIG. 3, an air flow passage 70 extending along the second duct 60 in the Z direction in the figure is formed in the housing 28 of the document feeder 20. The air flow passage 70 is connected to the second duct 60 through an opening 61 formed in a wall that constitutes a portion of the second duct 60 and faces the minus Y direction. The air flow flowing through the second duct 60 flows through the opening 61 into the air flow passage 70. Of walls constituting the air flow passage 70, a wall 281 located to face a document separating member 33 is provided with a plurality of second discharge holes 282, 283. An opening of each of the plurality of second discharge holes 282, 283 is oriented to the direction of feed of the original document. Thus, in the process of flowing of air through the second duct 60 in the Z direction in the figure, air directed in the direction of feed of the original document is discharged from above the original document (the plus Y side in the figure) through the plurality of second discharge holes 282, 283. As will be described later with reference to FIG. 6A, the plurality of second discharge holes 282, 283 comprise sixteen second discharge holes 282A to 282H, 283A to 283H. Hereinafter, when the discharge holes are described distinctively from each other, each of them will be identified by attaching a suffix "A", "B" or the like to the reference numeral. On the other hand, unless distinguished, the discharge holes will be described using the reference numerals only without any suffix "A", "B" or the like.

As shown in FIGS. 4A and 5, a first opening 22 is formed in a wall of the document feeder 20 facing the reader 30. The first opening 22 is connected to the second branch passage 43 of the branch duct 41. Thus, the air flow flowing through the second branch passage 43 is discharged through the first opening 22 to the outside of the document feeder 20. A second opening 39 is formed in a wall of the housing 38 of the reader 30 facing the first opening 22. The air discharged through the first opening 22 flows into the second opening 39. The second opening 39 is connected to the first duct 50 provided in the housing 38 of the reader 30. Thus, the air flow created by the fan 40 flows through the second opening 39 into the first duct 50. As shown in FIG. 3, a portion of walls constituting the first duct 50 is formed of the document separating member 33 and a plurality of first discharge holes 331, 332 are formed in the document separating member 33. An opening of each of the plurality of first discharge holes 331, 332 is oriented to the direction of feed of the original document. Thus, in the process of flowing of air through the first duct 50 in the Z direction in the figure, air directed in the direction of feed of the original document is discharged from below the original document (the minus Y side in the figure) through the plurality of first discharge holes 331, 332. As will be described later with reference to FIG. 6B, the plurality of first discharge holes 331, 332 comprise sixteen first discharge holes 331A to 331H, 332A to 332H. Hereinafter, when the discharge holes are described distinctively from each other, each of them will be identified by attaching a suffix "A", "B" or the like to the reference numeral. On the other hand, unless distinguished, the discharge holes will be described using the reference numerals only without any suffix "A", "B" or the like.

As thus far described, in the image reading device 10, the first duct 50 is provided in the housing 38 of the reader 30 to allow the air flow created by the fan 40 to flow through the first duct 50 on the side of the document separating member 33 facing the minus Y direction (the second direction) and in the direction perpendicular to the direction of feed of the original document, the document separating member 33 is provided with the plurality of first discharge holes 331, 332 through which the air flowing through the first duct 50 is discharged, the second duct 60 is provided in the housing 28 of the document feeder 20 to allow the air created by the fan 40 to flow through the second duct 60 on the side of the wall 281 facing the Y direction (the first direction) and in the direction perpendicular to the direction of feed of the original document, and the wall 281 is provided with the plurality of second discharge holes 282, 283 through which the air flowing through the second duct 60 is discharged. Thus, the original document fed to the reading position on the front surface of the first original glass plate 31 by the conveyance roller pair 26 can be guided in the direction of feed of the original document by (1) air directed in the direction of feed of the original document from below the original document (the minus Y side in the figure) through the plurality of first discharge holes 331, 332 and (2) air directed in the direction of feed of the original document from above the original document (the plus Y side in the figure) through the plurality of second discharge holes 281, 283. As can be seen from the above, the original document is guided in the direction of feed while being sandwiched between the above airs indicated by (1) and (2) from above and below. Therefore, even a thin original document can be fed in a stable posture. Furthermore, the original document can be separated from the front surface of the first original glass plate 31, without contact of the leading end of the original document with the document separating member 33, by the flow of the air indicated by (2) and discharged through the plurality of second discharge holes 282, 283 provided in the document separating member 33. Thus, it can be avoided that the leading end of the original document makes contact with the document separating member 33 to displace the original document and thus deteriorate the quality of reading of the original document.

Meanwhile, as shown in FIG. 4B, the document feeder 20 is formed to pivotally open and close about a fulcrum provided by a portion of the housing 38 of the reader 30. When the document feeder 20 is open, the second original glass plate 32 is opened to the outside, so that an original document can be placed on the second original glass plate 32. When the document feeder 20 is then closed, the original document placed on the second original glass plate 32 is held by the document feeder 20. The opening and closing of the document feeder 20 are achieved by an opening and closing device 29 composed of a base portion fixed at one end of a top surface of the housing 38 of the reader 30, a support pin supporting the document feeder 20 pivotally mounted to the base portion, and so on.

As shown in FIGS. 4A, 4B, and 5, the reader 30 is provided with a cover portion 80 formed of a flat plate member and covering the second opening 39. The cover portion 80 is slidable in the Z direction in the figures by a slide mechanism composed of a gear, a belt, and so on. A rotating force applied to the support pin of the opening and closing device 29 is transmitted to the slide mechanism by a known power transmission mechanism composed of a gear, a belt, a link, and so on and the transmitted force slides the cover portion 80. Thus, the cover portion 80 slides according to the opening and closing actions of the document feeder 20 to open and close the second opening 39. In other words, the cover portion 80 covers the second opening 39 when the document feeder 20 is open, and the cover portion 80 opens the second opening 39 when the document feeder 20 is closed. Thus, it can be prevented that when the document feeder 20 is open, foreign matters, such as dust, fall into the second opening 39.

Figure 6A:
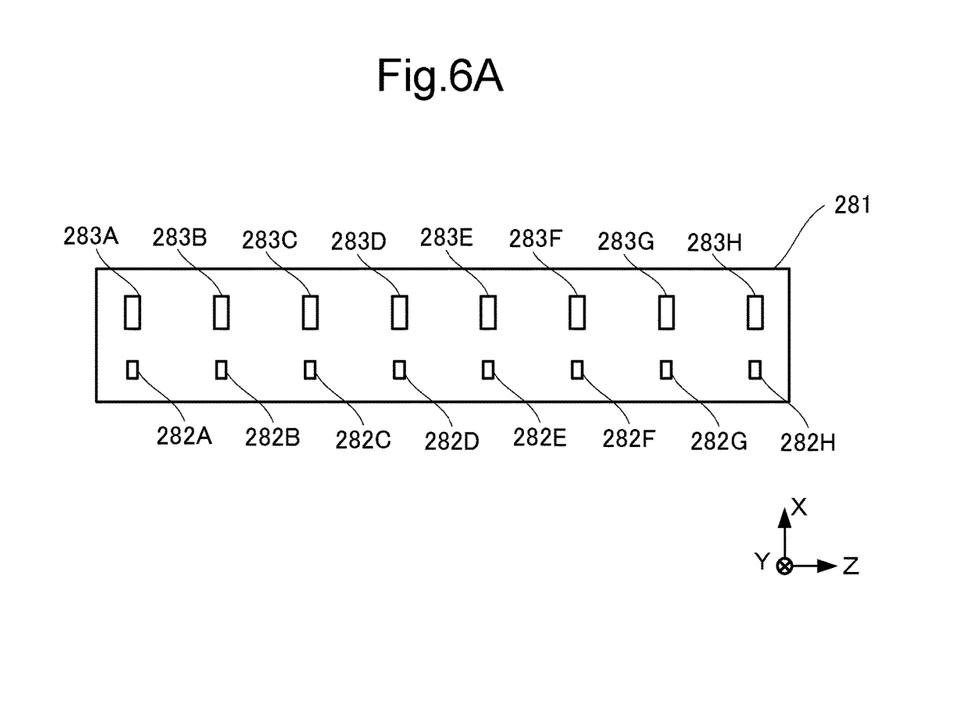
FIG. 6A is a view showing a plurality of second discharge holes formed in a wall of a document feeder according the one embodiment of the present disclosure and FIG. 6B is a view showing a plurality of first discharge holes formed in a document separating member according to the one embodiment of the present disclosure.

FIG. 6A is a view showing the plurality of second discharge holes 282A to 282H, 283A to 283H formed in the wall 281 of the document feeder 20. As shown in this figure, the plurality of second discharge holes 282A to 282H, 283A to 283H are arranged so that two rows of second discharge holes, each row composed of second discharge holes aligned at equal intervals in the direction (the Z direction in the figure) perpendicular to the direction of feed of the original document, are juxtaposed in the direction of feed (the X direction in the figure). The second discharge holes 283A to 283H constituting one of the two rows of second discharge holes are formed to have a larger opening than the second discharge holes 282A to 282H constituting the other row of second discharge holes located upstream of the second discharge holes 283A to 283H in the direction of feed of the original document. In other words, the second discharge holes 282A to 282H, 283A to 283H are formed so that the discharge holes constituting the row of second discharge holes farther from the reading position on the front surface of the first original glass plate 31 have a larger size than the discharge holes constituting the other row of second discharge holes closer to the reading position. Thus, the amount of air discharged through the second discharge holes 283A to 283H becomes larger than that of air discharged through the second discharge holes 282A to 282H.

Figure 6B:
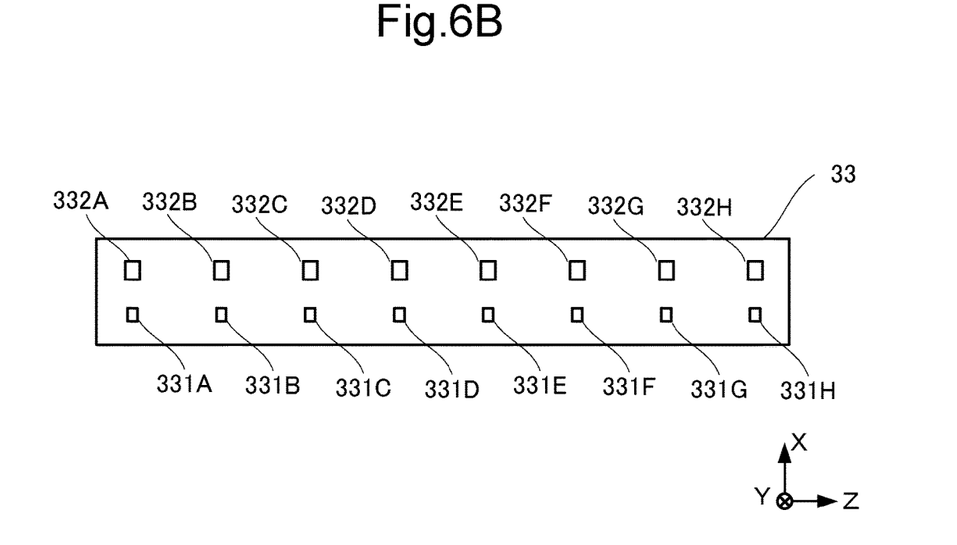

FIG. 6B is a view showing the plurality of first discharge holes 331A to 331H, 332A to 332H formed in the document separating member 33. As shown in this figure, the plurality of first discharge holes 331A to 331H, 332A to 332H are arranged so that two rows of first discharge holes, each row composed of first discharge holes aligned at equal intervals in the direction (the Z direction in the figure) perpendicular to the direction of feed of the original document, are juxtaposed in the direction of feed (the X direction in the figure). The first discharge holes 332A to 332H constituting one of the two rows of first discharge holes are formed to have a larger opening than the first discharge holes 331A to 331H constituting the other row of first discharge holes located upstream of the first discharge holes 332A to 332H in the direction of feed of the original document. In other words, the first discharge holes 331A to 331H, 332A to 332H are formed so that the discharge holes constituting the row of first discharge holes farther from the reading position on the front surface of the first original glass plate 31 have a larger size than the discharge holes constituting the other row of first discharge holes closer to the reading position. Thus, the amount of air discharged through the first discharge holes 332A to 332H becomes larger than that of air discharged through the first discharge holes 331A to 331H.

In the general image reading device described previously, when an original document made of a thin sheet of paper or the like is fed, the original document may be displaced by the air flow to deteriorate the quality of reading of the original document or cause a paper jam. Furthermore, in a general structure provided with a document separating member, the leading end of the original document may make contact with the document separating member to displace the original document and thus deteriorate the quality of reading of the original document.

Unlike the above, in this embodiment, since, as described previously, the amounts of air discharged through the first discharge holes 331A to 331H, 332A to 332H and the second discharge holes 282A to 282H, 283A to 283H are increased with distance from the reading position on the front surface of the first original glass plate 31, the force in the direction of feed of the original document applied from the air flow to the original document can be increased with approach to the leading end of the original document. Thus, the original document can be fed in a more stable posture.

Furthermore, as shown in FIGS. 3 and 5, the plurality of first discharge holes 331A to 331H are formed to face the plurality of second discharge holes 282A to 282H, respectively. Also, the plurality of first discharge holes 332A to 332H are formed to face the plurality of second discharge holes 283A to 283H, respectively. Thus, the air directed in the direction of feed of the original document from below the original document (the minus Y side in the figures) through the plurality of first discharge holes 331, 332 and the air directed in the direction of feed of the original document from above the original document (the plus Y side in the figures) through the plurality of second discharge holes 281, 283 blow on the same positions of the original document from above and below. Therefore, the original document can be fed in a more stable posture. Not all of the plurality of first discharge holes 331A to 331H, 332A to 332H, but at least one (for example, the first discharge holes located at both ends) of them may be formed to face one of the plurality of second discharge holes 282A to 282H, 283A to 283H. Alternatively, not all of the rows of first discharge holes, but at least one row of first discharge holes (for example, the first discharge holes 331A to 331H) may be formed to face one of the plurality of second discharge holes 282A to 282H, 283A to 283H.

The present disclosure is not limited to the above embodiment and can be modified in various ways.

Modification 1

Figure 7:
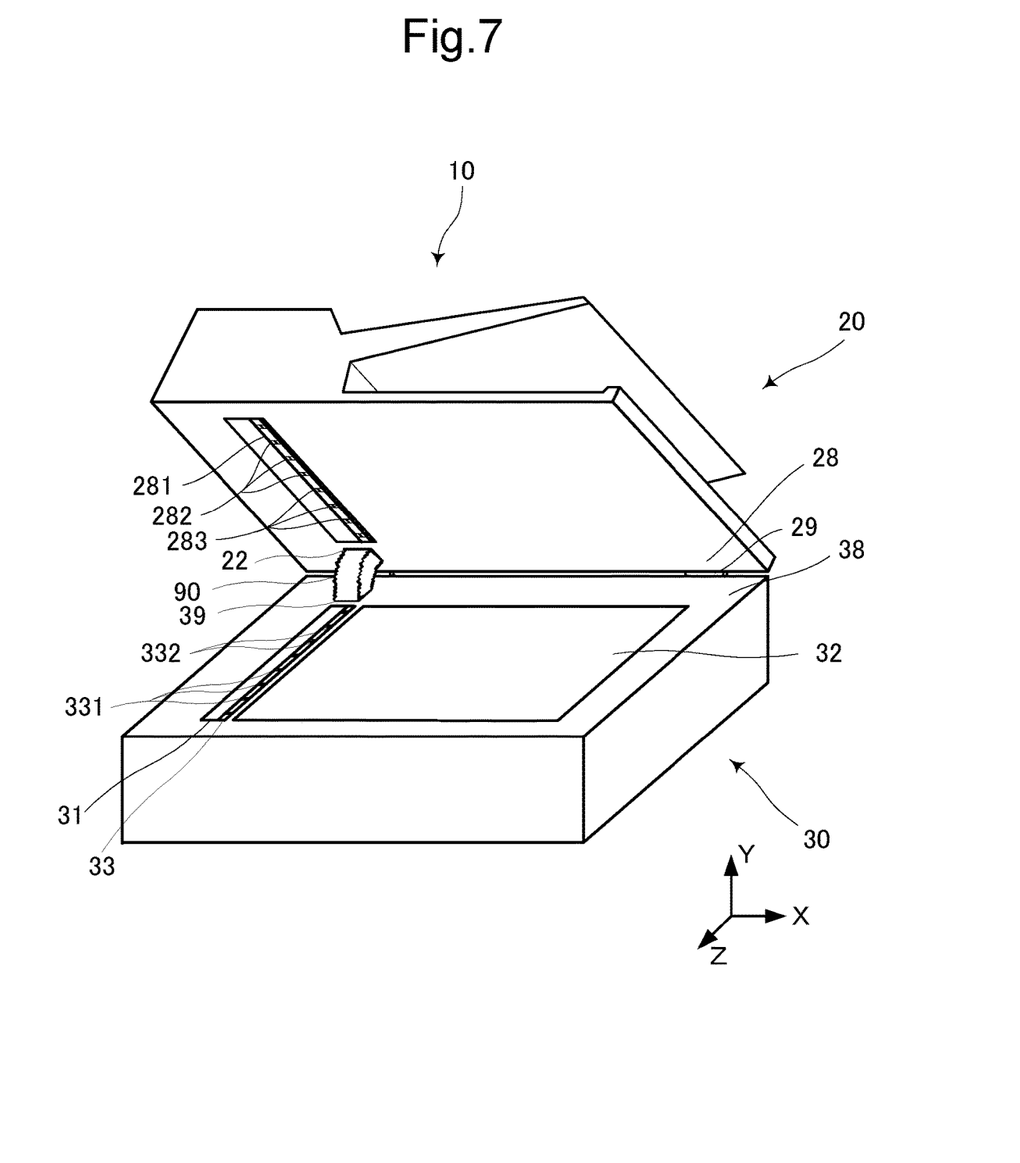
FIG. 7 is a perspective view showing an image reading device according to Modification 1.

FIG. 7 is a perspective view showing an image reading device according to Modification 1. As shown in this figure, in the image reading device according to Modification 1, an accordion duct 90 connecting the first opening 22 and the second opening 39 is provided between the first opening 22 and the second opening 39. Thus, air discharged through the first opening 22 can be flowed into the second opening 39 without leakage. Furthermore, since the duct 90 can be accordion-folded, it is deformable according to the opening and closing actions of the document feeder 20 as shown in FIG. 7.

Modification 2

Figure 8A:
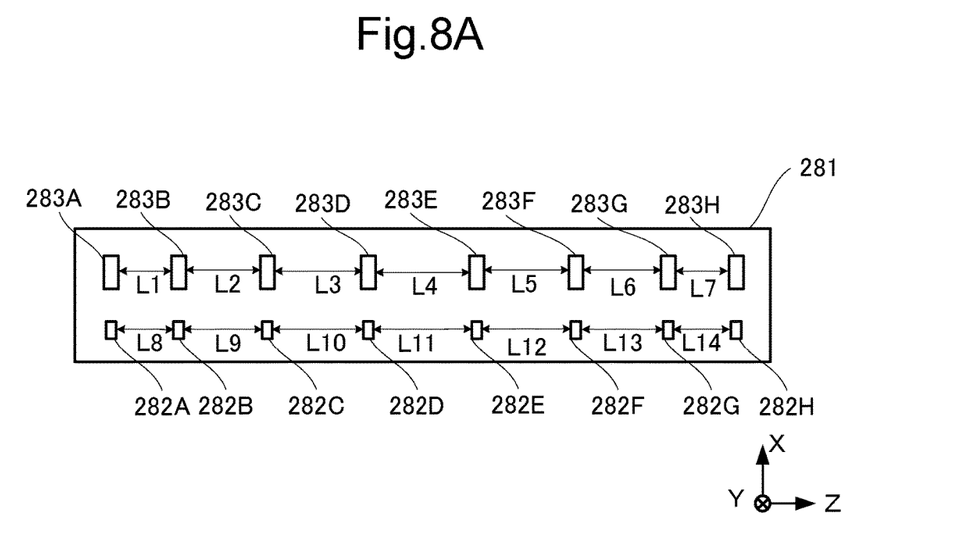
FIG. 8A is a view showing a plurality of second discharge holes formed in a wall of a document feeder according Modification 2 and FIG. 8B is a view showing a plurality of first discharge holes formed in a document separating member according to Modification 2.

FIG. 8A is a view showing a plurality of second discharge holes formed in a wall of a document feeder of an image reading device according Modification 2. In the above embodiment, the second discharge holes 282, 283 are aligned at equal intervals in the direction (the Z direction in the figure) perpendicular to the direction of feed of the original document. Unlike this, in Modification 2, the second discharge holes 282, 283 are formed to narrow distances between adjacent pairs of the second discharge holes 282, 283 with approach to both ends of the wall 281 of the document feeder 20 in the direction perpendicular to the direction of feed. In other words, as for the distances L1 to L7 between adjacent pairs of the plurality of second discharge holes 283, the inequality "L1, L7<L2, L6<L3, L5<L4" holds. Furthermore, as for the distances L8 to L14 between adjacent pairs of the plurality of second discharge holes 282, the inequality "L8, L14<L9, L13<L10, L12<L11" holds.

Figure 8B:
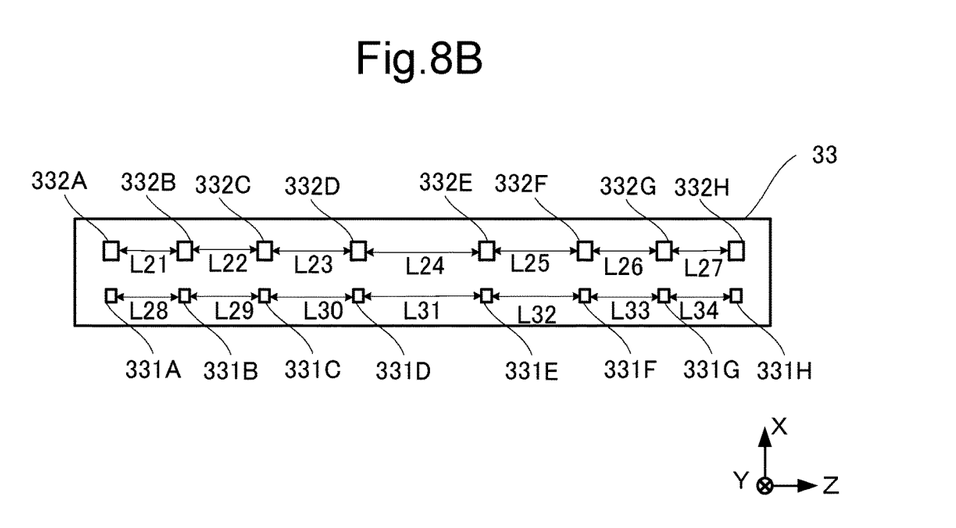

FIG. 8B is a view showing a plurality of first discharge holes formed in a document separating member of the image reading device according to Modification 2. In the above embodiment, the first discharge holes 331, 332 are aligned at equal intervals in the direction (the Z direction in the figure) perpendicular to the direction of feed of the original document. Unlike this, in Modification 2, the first discharge holes 331, 332 are formed to narrow distances between adjacent pairs of the first discharge holes 331, 332 with approach to both ends of the document separating member 33 in the direction perpendicular to the direction of feed. In other words, as for the distances L21 to L27 between adjacent pairs of the plurality of first discharge holes 332, the inequality "L21, L27<L22, L26<L23, L25<L24" holds. Furthermore, as for the distances L28 to L34 between adjacent pairs of the plurality of first discharge holes 331, the inequality "L28, L34<L29, L33<L30, L32<L31" holds.

The posture of the ends of the original document in the direction perpendicular to the direction of feed is likely to be unstable. Therefore, in the image reading device according to Modification 2, the first discharge holes 331, 332 and the second discharge holes 282, 283 are more densely arranged with approach to both ends of the wall 281 and the document separating member 33 in the direction perpendicular to the direction of feed. Thus, the posture of the ends of the original document that would otherwise be likely to be unstable can be stabilized.

Modification 3

Figure 9A:
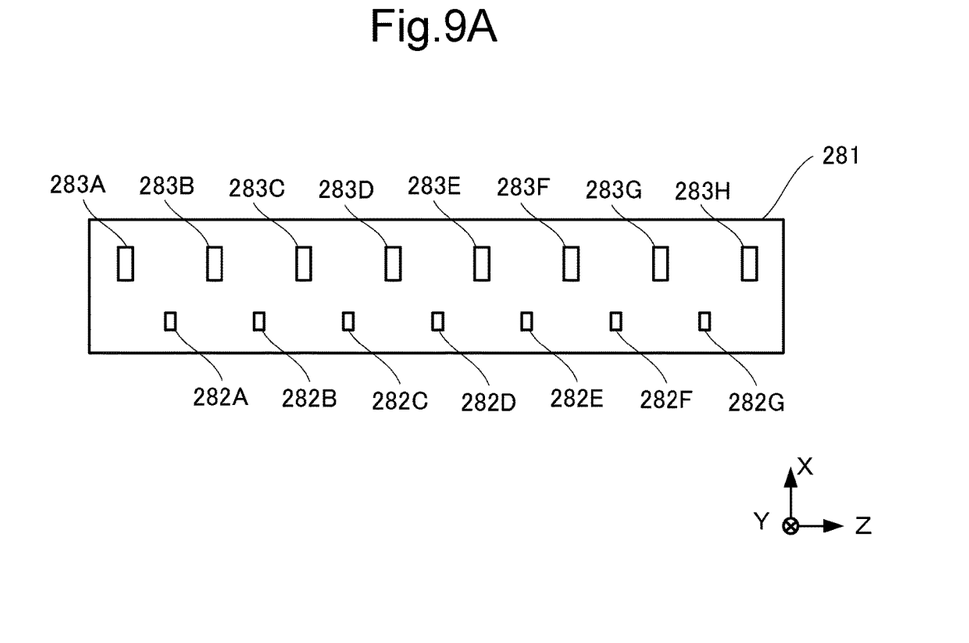
FIG. 9A is a view showing a plurality of second discharge holes formed in a wall of a document feeder according Modification 3 and FIG. 9B is a view showing a plurality of first discharge holes formed in a document separating member according to Modification 3.

FIG. 9A is a view showing a plurality of second discharge holes formed in a wall of a document feeder of an image reading device according to Modification 3. In the above embodiment, the second discharge holes constituting each row of second discharge holes are located at the same positions in the direction perpendicular to the direction of feed as the second discharge holes constituting the adjacent row of second discharge holes. Unlike this, in Modification 3, the second discharge holes constituting each row of second discharge holes are different in position in the direction perpendicular to the direction of feed from the second discharge holes constituting the adjacent row of second discharge holes. For example, the second discharge hole 283A is different in position in the Z direction from the second discharge hole 282A.

Figure 9B:
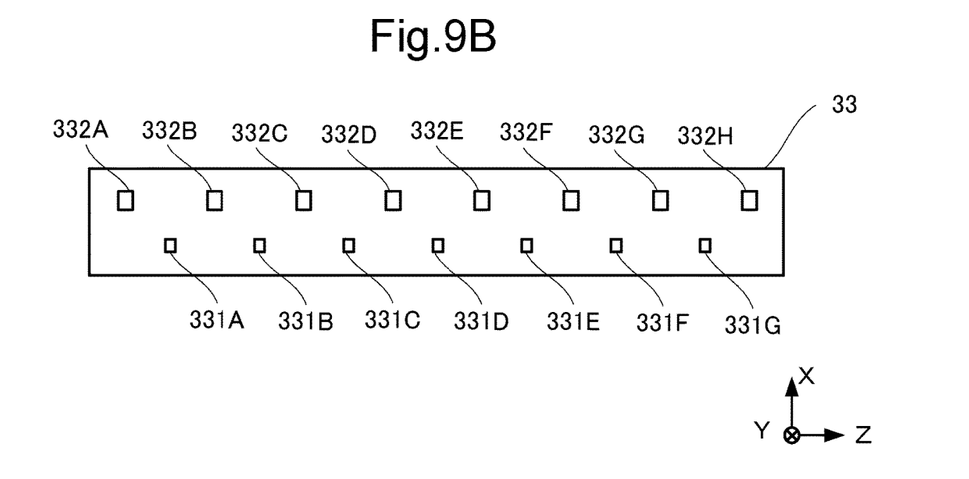

FIG. 9B is a view showing a plurality of first discharge holes formed in a document separating member of the image reading device according to Modification 3. In the above embodiment, the first discharge holes constituting each row of first discharge holes are located at the same positions in the direction perpendicular to the direction of feed as the first discharge holes constituting the adjacent row of first discharge holes. Unlike this, in Modification 3, the first discharge holes constituting each row of first discharge holes are different in position in the direction perpendicular to the direction of feed from the first discharge holes constituting the adjacent row of first discharge holes. For example, the first discharge hole 331A is different in position in the Z direction from the first discharge hole 332A.

By employing the above structure, air can be blown, through another row of first discharge holes adjacent to one row of first discharge holes and another row of second discharge holes adjacent to one row of second discharge holes, on locations where air does not blow through the one row of first discharge holes and the one row of second discharge holes. Thus, the original document can be fed in a more stable posture.

Modification 4

Figure 10A:
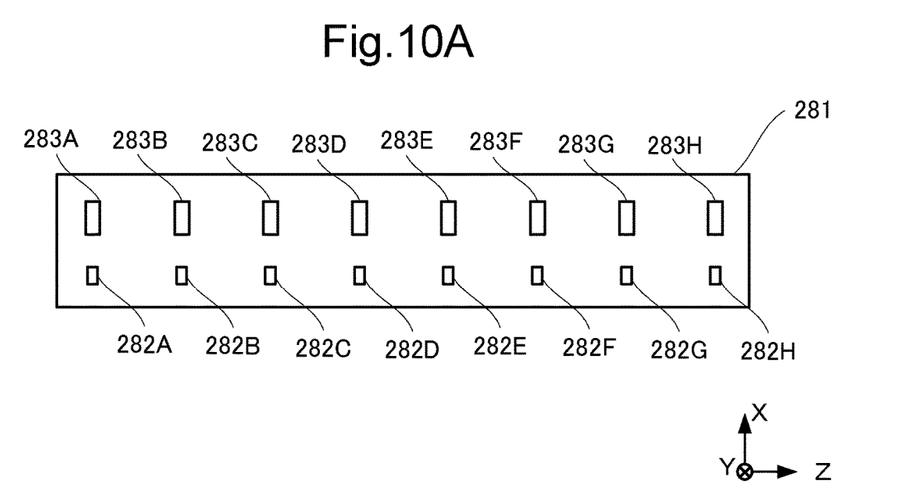
FIGS. 10A and 10B are views showing a plurality of second discharge holes formed in a wall of a document feeder of an image reading device according Modification 4 and FIG. 10C is a view showing a case where all the second discharge holes are oriented in the same direction.
Figure 10B:
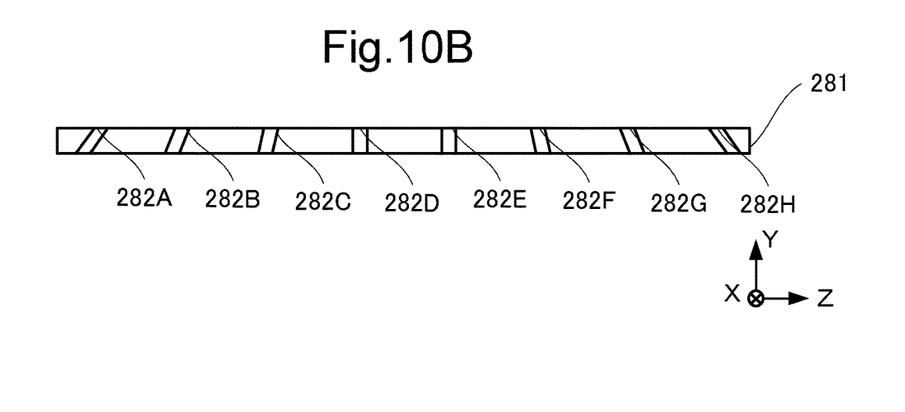
Figure 10C:
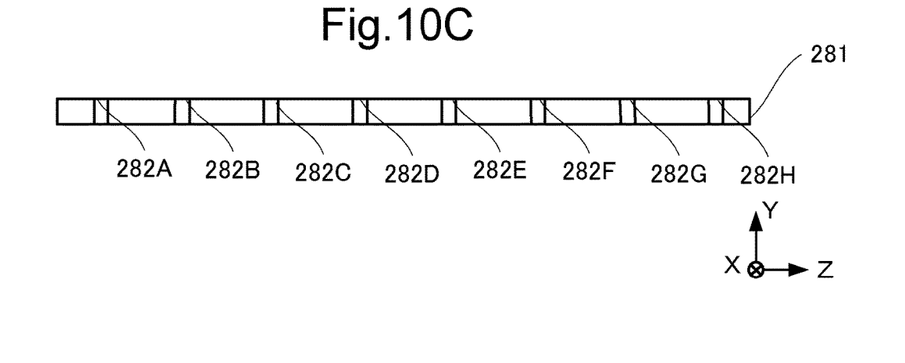

FIG. 10A is a view showing a plurality of second discharge holes formed in a wall of a document feeder of an image reading device according to Modification 4 and FIG. 10B is a view showing the plurality of second discharge holes when viewed from a different direction from that of FIG. 10A. As shown in FIG. 10B, in the image reading device according to Modification 4, the second discharge holes 282A to 282H are formed to orient their openings toward the middle of the wall 281 of the document feeder 20 in the direction (the Z direction in the figure) perpendicular to the direction of feed. Thus, a force toward the middle of the original document can be applied to the ends of the original document. As compared to the case where all the second discharge holes 282A to 282H are oriented in the Y direction as shown in FIG. 10C, the posture of the ends of the original document that would otherwise be likely to be unstable can be stabilized.

In the same manner as above, the second discharge holes 283A to 283H are also formed to orient their openings toward the middle of the wall 281 of the document feeder 20 in the direction (the Z direction in the figure) perpendicular to the direction of feed. Not all of the second discharge holes 282A to 282H, 283A to 283H, but at least some (for example, the second discharge holes located at both ends) of them may be formed to orient their openings toward the middle of the wall 281 of the document feeder 20 in the direction perpendicular to the direction of feed.

Furthermore, the first discharge holes 331A to 331H, 332A to 332H are also formed to orient their openings toward the middle of the document separating member 33 in the direction perpendicular to the direction of feed. Not all of the first discharge holes 331A to 331H, 332A to 332H, but at least some (for example, the first discharge holes located at both ends) of them may be formed to orient their openings toward the middle of the document separating member 33 in the direction perpendicular to the direction of feed.

Modification 5

Figure 11:
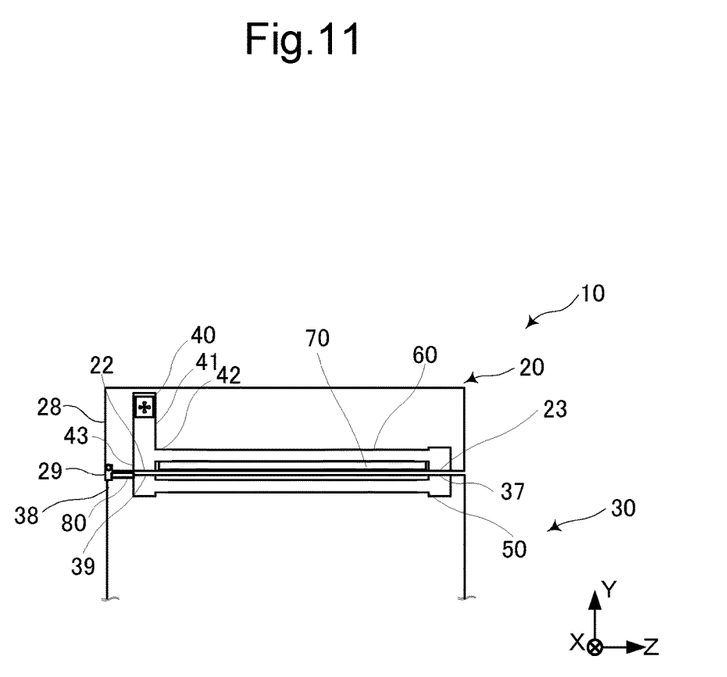
FIG. 11 is a view showing an image reading device according to Modification 5.

FIG. 11 is a view showing an image reading device according to Modification 5. As shown in this figure, a third opening 23 is formed in the wall of the document feeder 20 facing the reader 30 and the third opening 23 is connected to an end of the second duct 60 opposite to the end thereof connected to the branch passage 42. Furthermore, a fourth opening 37 is formed in a portion of the wall of the reader 30 facing the third opening 23 and the fourth opening 37 is connected to an end of the first duct 50 opposite to the end thereof connected to the second opening 39. Thus, air flowing through the first duct 50 and then reaching the end thereof is discharged through the fourth opening 37 and the air discharged through the fourth opening 37 flows through the third opening 23 into the second duct 60. Moreover, air flowing through the second duct 60 and reaching the end thereof is discharged through the third opening 23 and the air discharged through the third opening 23 flows through the fourth opening 37 into the first duct 50.

When the flow rate of the air having reached the end of the second duct 60 is higher than that of the air having reached the end of the first duct 50, the air flows from the second duct 60 through the third opening 23 and the fourth opening 37 into the first duct 50. On the other hand, when the flow rate of the air having reached the end of the first duct 50 is higher than that of the air having reached the end of the second duct 60, the air flows from the first duct 50 through the fourth opening 37 and the third opening 23 into the second duct 60. In this manner, the air flow flowing through the first duct 50 and the air flow flowing through the second duct 60 can complement each other. Therefore, it can be avoided that air is less discharged through either the first discharge holes 331, 332 or the second discharge holes 282, 283.

Modification 6

Figure 12A:
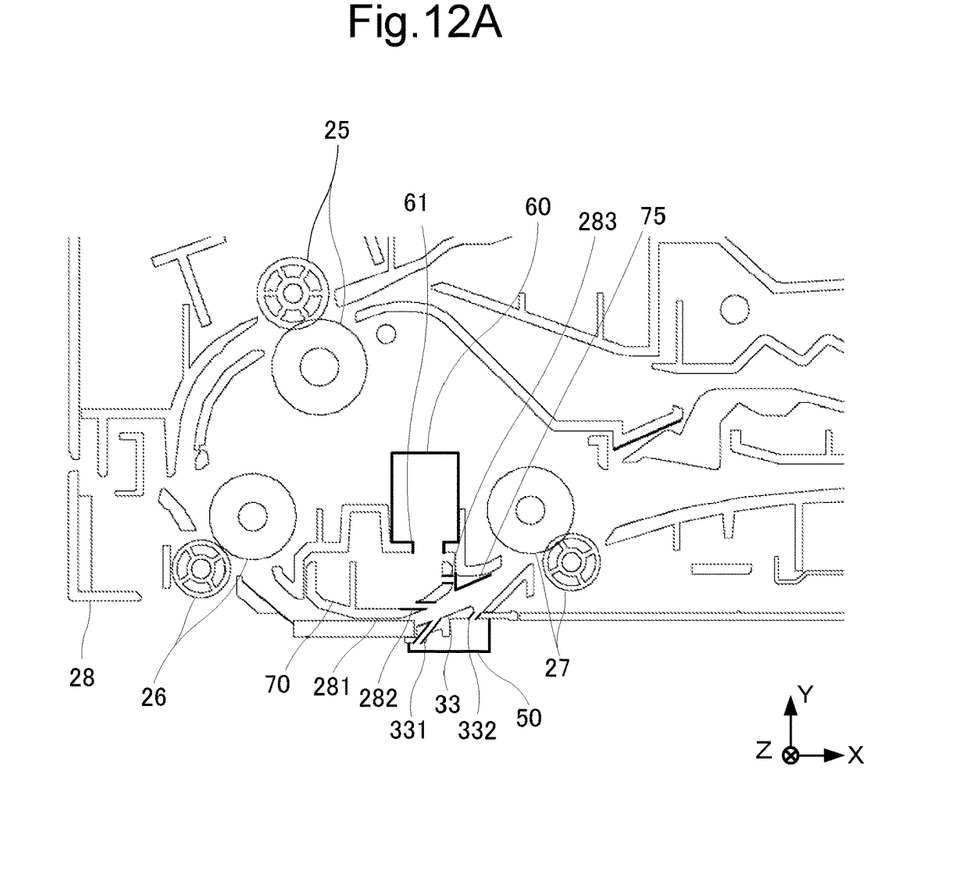
FIG. 12A is a cross-sectional view showing an image reading device according to Modification 6 and FIG. 12B is a plan view showing a guide member of the image reading device according to Modification 6.
Figure 12B:
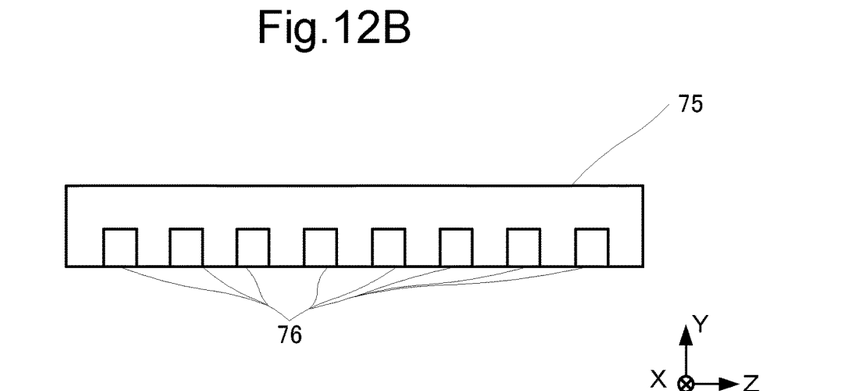

FIG. 12A is a cross-sectional view showing an image reading device according to Modification 6. As shown in this figure, in the image reading device according to Modification 6, a guide member 75 is provided in the interior of the housing 28 of the document feeder 20 to guide the air flow discharged through the plurality of second discharge holes 283 to a location near the original document being fed by the document feeder 20. FIG. 12B is a plan view showing the guide member 75. As shown in this figure, the guide member 75 is provided with openings 76 facing the plurality of second discharge holes 283. The air discharged through the plurality of second discharge holes 283 is guided through the openings 76 to the location near the original document being fed by the document feeder 20. As just described, since the image reading device according to Modification 6 can guide the air flow discharged through the plurality of second discharge holes 283 to the location near the original document, the original document can be fed in a more stable posture. Furthermore, since the openings 76 are provided to face the plurality of second discharge holes 283, the air can be efficiently guided to the location near the original document.

Other Modifications

Although the description in the above embodiment has been given of the case where the fan for allowing air to flow through the first duct 50 and the second duct 60 is provided in the interior of the housing 28 of the document feeder 20, the present disclosure is not necessarily limited to this case. The fan may be provided, not in the interior of the housing 28 of the document feeder 20, but in the interior of the housing 38 of the reader 30. Alternatively, not only the fan is provided in the interior of the housing 28 of the document feeder 20, but also another fan may be provided in the interior of the housing 38 of the reader 30.

Although the description in the above embodiment has been given of the case where two rows of first discharge holes 331, 332 and two rows of second discharge holes 282, 283 are provided, the present disclosure is not necessarily limited to this case. Three or more rows of first discharge holes 331, 332 . . . and three or more rows of second discharge holes 282, 283 . . . may be provided.

The structure shown in the above embodiment and the structures shown in the above modifications may be appropriately combined.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image reading device comprising:
    a document feeder that includes a document tray and feeds an original document loaded on the document tray; and
    a reader including an original glass plate, a reading unit that reads the original document fed to a predetermined reading position on a surface of the original glass plate facing a first direction by the document feeder, the reading unit reading the original document from a side of the original glass plate facing a second direction opposite to the first direction, and a document separating member that guides the original document read by the reading unit to separate the original document from the surface of the original glass plate facing the first direction, the document separating member being provided downstream of the reading position in a direction of feed of the original document,
    wherein at least one of the document feeder and the reader is provided with a fan that creates an air flow,
    a first duct extending in a direction perpendicular to the direction of feed is provided in a housing of the reader to allow the air flow created by the fan to flow through the first duct on a side of the document separating member facing the second direction and in the direction perpendicular to the direction of feed,
    the document separating member is provided with a plurality of first discharge holes through which the air flowing through the first duct is discharged,
    a second duct extending in the direction perpendicular to the direction of feed is provided in a housing of the document feeder and allows the air flow created by the fan to flow through the second duct on a side of a wall of the document feeder facing the first direction and in the direction perpendicular to the direction of feed, the wall facing the document separating member, and
    the wall of the document feeder is provided with a plurality of second discharge holes through which the air flowing through the second duct is discharged.

2. The image reading device according to claim 1, wherein
    only the document feeder is provided with the fan,
    a branch duct is further provided in the housing of the document feeder, the branch duct including two branch passages where the air flow created by the fan is divided into two flows,
    one of the two branch passages is connected to the second duct,
    a first opening is formed in a wall of the document feeder facing the reader, the first opening being connected to the other of the two branch passages so that the air flowing through the other of the two branch passages is discharged through the first opening to outside of the document feeder, and
    a second opening is formed in a wall of the reader facing the first opening, the second opening being connected to the first duct so that the air flow discharged through the first opening flows through the second opening into the first duct.

3. The image reading device according to claim 2, wherein
    the document feeder is formed to pivotally open and close about a fulcrum provided by a portion of the housing of the reader, and
    the reader further includes a cover portion that opens and closes according to opening and closing actions of the document feeder, the cover portion covering the second opening when the document feeder is open, the cover portion opening the second opening when the document feeder is closed.

4. The image reading device according to claim 2, further comprising an accordion duct provided between the first opening and second opening and connecting the first opening and second opening.

5. The image reading device according to claim 2, wherein
    a third opening is formed in the wall of the document feeder facing the reader, the third opening being connected to an end of the second duct opposite to an end of the second duct connected to the one of the two branch passages, and
    a fourth opening is formed in a portion of the wall of the reader facing the third opening, the fourth opening being connected to an end of the first duct opposite to an end of the first duct connected to the second opening.

6. The image reading device according to claim 1, wherein
    the plurality of first discharge holes comprise at least one row of first discharge holes in which a plurality of first discharge holes are aligned in the direction perpendicular to the direction of feed, and
    the plurality of first discharge holes constituting the at least one row of first discharge holes are formed to narrow distances between adjacent pairs of the plurality of first discharge holes with approach to both ends of the document separating member in the direction perpendicular to the direction of feed.

7. The image reading device according to claim 6, wherein at least some of the plurality of first discharge holes constituting the at least one row of first discharge holes are formed to orient openings of the at least some first discharge holes toward a middle of the document separating member in the direction perpendicular to the direction of feed.

8. The image reading device according to claim 6, wherein
the plurality of first discharge holes are formed in a manner in which a plurality of rows of the one row of first discharge holes are aligned in the direction of feed, and
the plurality of rows of first discharge holes are formed so that the first discharge holes constituting one of the plurality of rows farther from the reading position have a larger size than the first discharge holes constituting another of the plurality of rows closer to the reading position.

9. The image reading device according to claim 6, wherein
the plurality of first discharge holes are formed in a manner in which a plurality of rows of the one row of first discharge holes are aligned in the direction of feed, and
the first discharge holes constituting each of the plurality of rows of first discharge holes are different in position in the direction perpendicular to the direction of feed from the first discharge holes constituting an adjacent row of the plurality of rows of first discharge holes.

10. The image reading device according to claim 6, wherein, among the plurality of first discharge holes, the first discharge holes constituting the at least one row of first discharge holes are formed to face one of the plurality of second discharge holes.

11. The image reading device according to claim 1, wherein
the plurality of second discharge holes comprise at least one row of second discharge holes in which a plurality of second discharge holes are aligned in the direction perpendicular to the direction of feed, and
the plurality of second discharge holes constituting the at least one row of second discharge holes are formed to narrow distances between adjacent pairs of the plurality of second discharge holes with approach to both ends of the wall of the document feeder in the direction perpendicular to the direction of feed, the wall facing the document separating member.

12. The image reading device according to claim 11, wherein at least some of the plurality of second discharge holes constituting the at least one row of second discharge holes are formed to orient openings of the at least some second discharge holes toward a middle of the wall of the document feeder in the direction perpendicular to the direction of feed, the wall facing the document separating member.

13. The image reading device according to claim 11, wherein
the plurality of second discharge holes are formed in a manner in which a plurality of rows of the one row of second discharge holes are aligned in the direction of feed, and
the plurality of rows of second discharge holes are formed so that the second discharge holes constituting one of the plurality of rows farther from the reading position have a larger size than the second discharge holes constituting another of the plurality of rows closer to the reading position.

14. The image reading device according to claim 11, wherein
the plurality of second discharge holes are formed in a manner in which a plurality of rows of the one row of second discharge holes are aligned in the direction of feed, and
the second discharge holes constituting each of the plurality of rows of second discharge holes are different in position in the direction perpendicular to the direction of feed from the second discharge holes constituting an adjacent row of the plurality of rows of second discharge holes.

15. The image reading device according to claim 1, wherein at least one of the plurality of first discharge holes is formed to face one of the plurality of second discharge holes.

16. The image reading device according to claim 1, wherein the document feeder further comprises a guide member that guides the air flow discharged through the plurality of second discharge holes to a location near the original document being fed by the document feeder.

17. The image reading device according to claim 16, wherein the guide member is provided with an opening facing the plurality of second discharge holes.

18. An image forming apparatus comprising:
the image reading device according to claim 1; and
an image forming section that forms on a recording paper sheet an image acquired by reading of the image reading device.

* * * * *